(12) United States Patent
De Petris et al.

(10) Patent No.: US 8,700,092 B2
(45) Date of Patent: Apr. 15, 2014

(54) METHOD AND SUBSCRIBER IDENTIFICATION CARD FOR USING A SERVICE THROUGH A MOBILE TELEPHONE TERMINAL USING RESOURCES OF ANOTHER MOBILE TELEPHONE TERMINAL

(75) Inventors: Gianluca De Petris, Turin (IT); Simonetta Mangiabene, Turin (IT); Giuseppe Mazara, Turin (IT); Davide Pratone, Turin (IT); Barbara Silano, Turin (IT)

(73) Assignee: Telecom Italia S.p.A., Milan (IT)

( * ) Notice: Subject to any disclaimer, the term of this patent is extended or adjusted under 35 U.S.C. 154(b) by 347 days.

(21) Appl. No.: 12/810,723

(22) PCT Filed: Dec. 27, 2007

(86) PCT No.: PCT/EP2007/011430
§ 371 (c)(1),
(2), (4) Date: Jun. 25, 2010

(87) PCT Pub. No.: WO2009/083016
PCT Pub. Date: Jul. 9, 2009

(65) Prior Publication Data
US 2010/0273424 A1 Oct. 28, 2010

(51) Int. Cl.
*H04M 1/00* (2006.01)

(52) U.S. Cl.
USPC ......... 455/558; 455/41.2; 455/414.1; 705/51; 705/80

(58) Field of Classification Search
None
See application file for complete search history.

(56) References Cited

U.S. PATENT DOCUMENTS 6,795,703 B2 * 9/2004 Takae et al. ............... 455/418
6,985,756 B2   1/2006 Castrogiovanni et al.
8,160,494 B2 * 4/2012 Tysowski .................. 455/41.2
2003/0050898 A1   3/2003 Oppat et al.
2004/0204087 A1 * 10/2004 Carlsson .................... 455/558
2005/0182710 A1 * 8/2005 Andersson et al. ........... 705/39
2006/0287004 A1 * 12/2006 Fuqua ........................ 455/558
2008/0081611 A1 * 4/2008 Hoyt et al. .................. 455/425
2009/0006116 A1 * 1/2009 Baker et al. .................. 705/1

FOREIGN PATENT DOCUMENTS

| EP | 1689199 A1 | 8/2006 |
| WO | 97/45814 A1 | 12/1997 |
| WO | 99/59360 A1 | 11/1999 |
| WO | 02/089449 A1 | 11/2002 |
| WO | 03/084265 A1 | 10/2003 |
| WO | 2005/104584 A1 | 11/2005 |
| WO | 2006/056220 A1 | 6/2006 |

OTHER PUBLICATIONS

International Search Report dtd Nov. 21, 2008, PCT/EP2007/011430.

* cited by examiner

*Primary Examiner* — Nay A Maung
*Assistant Examiner* — Alejandro Rivero
(74) *Attorney, Agent, or Firm* — Banner & Witcoff, Ltd.

(57) ABSTRACT

A method is provided which allows a service to be enjoyed through a mobile telephone terminal without the need of paying for this service. This can be achieved by allowing a first subscriber to use the credit or subscription of a second subscriber. The subscriber identification cards at least of the two subscribers involved are provided with short range radio communication transceivers and establish a short range communication channel between them so that one card may request the other card to pay for this service and the other card may grant this request through this channel. Then the mobile telephone networks of the cards are informed of the granted request. Before, during and after the grant of the request, the subscriber identification cards remain active and operative in communicating together and with the associated terminals.

22 Claims, 6 Drawing Sheets

METHOD AND SUBSCRIBER IDENTIFICATION CARD FOR USING A SERVICE THROUGH A MOBILE TELEPHONE TERMINAL USING RESOURCES OF ANOTHER MOBILE TELEPHONE TERMINAL

CROSS REFERENCE TO RELATED APPLICATIONS

This is a U.S. National Phase Application under 35 U.S.C. §371 of International Application No. PCT/EP2007/011430 filed Dec. 27, 2007, which was published Under PCT Article 21(2), the entire contents of which are incorporated herein by reference.

FIELD OF THE INVENTION

The present invention relates to a method for enjoying a service through a mobile telephone terminal and to a subscriber identification card for implementing it.

BACKGROUND OF THE INVENTION

Nowadays, in order to use a mobile telephone terminal, a telephone subscriber identification card is to be inserted within it. Such card is generally called UICC [Universal Integrated Circuit Card]; for GSM [Global System for Mobile communications] the UICC contains a SIM [Subscriber Identity Module] application and for UMTS [Universal Mobile Telecommunications System] the UICC contains a USIM [Universal Subscriber Identity Module] application; UICC may contain several applications, making it possible for the same card to give access to e.g. both GSM and UMTS networks and also to provide storage of other applications and/or of user data, for example a phone book.

Telephone subscriber identification cards securely store not only subscriber identification information but also subscriber authentication information; for example, a SIM card stores an IMSI [International Mobile Subscriber Identity] code and a KI [Authentication Key] code.

A mobile telephone operator provides its subscribers with at least a voice communication service and very often other services like data communication services (e.g. GPRS [General Packet Radio Service], WAP [Wireless Application Protocol] internet navigation, FTP [File Transfer Protocol] download or upload, SMS [Short Message Service] transfer, MMS [Multimedia Messaging Service] transfer, DVB-H [Digital Video Broadcasting—Handheld] reception), entertainment services (e.g. playback of multimedia content protected by DRM [Digital Rights Management]) and other more specific services. A user may be subscribed (i.e. enabled) to one or more of these services and is generally called a subscriber.

A subscriber may pay the subscribed services basically in two different ways: in credit mode or in debit mode; in debit mode, the subscriber pays money before using services and accumulates a credit that can be used afterwards; in credit mode, the subscriber uses services and accumulates a debit that can be settled afterwards. The payment mode is part of the user subscription with the mobile telephone operator.

It may happen (A) that a subscriber would like to use one of his subscribed services but he has no or not enough credit or (B) that a subscriber would like to use one of his subscribed services but he does not want to pay for it.

In these cases, a first option for the first subscriber is to ask a second subscriber to use his mobile telephone terminal (this option may be used if the second subscriber is subscribed to the service of interest to the first subscriber); a second option for the first subscriber is to ask a second subscriber to extract the telephone subscriber identification card from the mobile telephone terminal of the second subscriber and then to insert it into the mobile telephone terminal of the first subscriber (this option may be used if the service of interest to the first subscriber does not require any specific information that is securely contained in the subscriber identification card of the first subscriber).

Both options are awkward and can not always be used.

Patent application WO 03/084265 discloses a method and an apparatus for accessing a network using remote subscriber identity information. Subscriber identity information in a memory within a device such as a mobile terminal can be remotely used by a second independent device. In the case of a GSM terminal, for example, one terminal would be able to utilize the subscriber identity information contained in the subscriber identity module (SIM) of another terminal by establishing a local communication link between the two terminals. Remote subscriber identity information is transferred over the local communication link and the communication terminal, which is using the remote subscriber identity information, can register with the telephone network using that information, thus, eliminating the need to transfer the SIM.

The idea of using subscriber identity information located or locatable remotely from the mobile telephone terminal was known even before the above mentioned patent application.

Patent application WO 99/59360 discloses an arrangement for communication of subscriber identity module related data in a wireless communication system. The arrangement comprises a wireless communication terminal with a subscriber identity unit which is adapted to comprise a subscriber identity module to which a subscriber identity is assigned. This patent application discloses also a method for communication of subscriber identity module related data in a wireless communication system for implementation in a wireless communication terminal with a subscriber identity unit. The subscriber identity unit is arranged to communicate the subscriber identity module related data such as the subscriber identity with the terminal over a local wireless communication link. The arrangement according to this patent application makes it possible to separate the subscriber identity unit from the terminal while the terminal is communicating in the wireless system.

Patent application US 2003/0211861(now U.S. Pat. No. 6,985,756) discloses an apparatus and a method that provide remote access to subscriber identity information and subscriber configuration information stored on one or more subscriber identity modules (SIMs) in order to allow remote configuration of wireless communications devices. A SIM server provides access to the SIMs, a SIM librarian catalogues the SIMs, and a SIM accounting system tracks and/bills for SIM usage. The apparatus and method provide remote access to proxy wireless communications devices, allowing such devices to operate as if actually present in the remote locations.

SUMMARY OF THE INVENTION

The Applicant has understood that the basic idea behind the solution according to patent application WO 03/084265 is that a first mobile telephone terminal "electronically borrows" a SIM card from a second mobile telephone terminal.

Anyway, the Applicant has also understood that the way in which this basic idea is implemented according to patent application WO 03/084265 has a number of disadvantages. According to this implementation, the terminal that "borrows" an external SIM card deactivates its internal SIM card; in this way, the user of this terminal can not use any of his user data, for example his phone book, and can no longer receive phone calls directed to him; additionally, the mobile telephone terminal needs to be specifically designed as it must able to communicate directly with another mobile telephone terminal and to deactivate/activate its internal SIM card. Still according to this implementation, both subscriber identification and authentication information are transferred from the SIM card of one terminal to a CPU memory of another terminal; in this way, very important secret information leave the protected environment of a SIM card and, what is worse, are stored into a freely accessible memory area.

The present invention aims in general at finding a solution for enjoying a service through a mobile telephone terminal without the need of directly paying for this service; precisely, the technical problem behind the present invention is how a first subscriber can to use the credit or subscription of a second subscriber.

More in particular, the solution should be practical and not awkward (e.g. no physical exchange of subscriber identity cards), should not require changes to existing mobile telephone terminals and should not allow abuses of user subscriptions and user data.

Advantageously, the solution should be flexible in terms of number and extent of services "borrowed" by one subscriber from another subscriber.

In order to solve the above mentioned problem, the Applicant has conceived that subscriber identification cards (at least of the two subscribers involved) be provided with a short range radio communication transceiver and establish a short range communication channel between them so that a first card may request to a second card to pay for one or more services and the second card may grant this request through this channel and then the mobile telephone networks of the cards are informed of the granted request; before, during and after the grant of the request the subscriber identification cards remain active and operative in communicating together and with the associated terminals.

The payment authorisation request is typically due to an input provided by a first user to the mobile telephone terminal where the first card is installed and the grant of the request is typically due to an input provided by a second user to the mobile telephone terminal where the second card is installed.

The request and/or the grant may comprise information specifying the authorisation scope, for example a period of time corresponding to the authorisation duration and/or an amount of money corresponding to the authorised payment.

The service enjoyed by the first subscriber thanks to the granted request may be fixed and predetermined or may be variable and, in the latter case, the request and/or the grant may comprise information specifying the service.

Preferably both mobile telephone terminals inform the mobile telephone networks of the granted authorisation. If the mobile telephone networks are different, an exchange of information may occur between the networks.

If one terminal only makes the notification to its network, this terminal may transmit information about both terminals and/or subscribers.

According to a typical application of the present invention, a first mobile telephone terminal requests its mobile telephone network to be associated to the identity of a second subscriber identification card, and a second mobile telephone terminal requests its mobile telephone network to be associated to the identity of the first subscriber identification card; in this way an "identity exchange" is achieved.

Advantageously, even in case of "identity exchange", due to the fact that the network or networks may be fully aware the exchange of identity, calls addressed to the first subscriber identification card may be directed to the first mobile telephone terminal and telephone calls addressed to the second subscriber identification card may be directed to the second mobile telephone terminal. More specifically, the exchange of identity between said first mobile telephone terminal and said second mobile telephone terminal may be effective for billing purposes only.

Advantageously, in case of "identity exchange", any authentication procedure of a subscriber identity is carried out through the card that rightfully holds this identity; in this way, there is no need to transmit authentication information securely stored within the card. This means that if an identity authentication is requested by e.g. the mobile telephone network during an "identity exchange", the two cards exchange information packets in order to correctly reply to the identity authentication request; preferably, the channel used for such exchange of information is secured and/or the exchanged information is encrypted (technologies for these purposes are already known and available).

One of the services that can be borrowed according to the present invention is an information (for example songs, movies, . . . ) download service; more and more in the future, these services will be provided through a DRM [Digital Right Management] system that allows enjoyment of the downloaded information only to e.g. the subscriber. In case of "identity exchange", if such a system is used, the encryption of information is done for the benefit of the true identity and not of the exchanged/borrowed identity even if the download is paid by the subscription associated to the exchanged/borrowed identity.

Basically, the termination of the authorisation by a second subscriber to a first subscriber may take place in three different ways: (A) any of the mobile telephone networks understands from the scope of the authorisation that the authorisation is exhausted, (B) any of the mobile telephone terminals informs the mobile telephone network that the authorisation is terminated due to the will of its subscriber, (C) any of the mobile telephone terminals detects that the short range communication channel is interrupted and consequently informs the mobile telephone network that the authorisation is terminated due to technical problems.

According to another aspect, the present invention also relates to a subscriber identification card having technical features adapted for implementing the above described method.

BRIEF DESCRIPTION OF THE DRAWINGS

The present invention will become more apparent from the following description to be considered in conjunction with the annexed drawing, wherein.

It is to be understood that the following description and the annexed drawings are not to be interpreted as limitations of the present invention but simply as exemplifications.

Additionally, it is to be noted that the present invention will be primarily described with reference to a simplified application scenario (FIG. 1) wherein both subscriber identity cards are associated to the same mobile telephone network; anyway, the present invention is applicable also to a more general case (FIG. 8) wherein the two subscriber identity cards are respectively associated to two different mobile telephone networks.

DETAILED DESCRIPTION OF THE INVENTION

Figure 1:
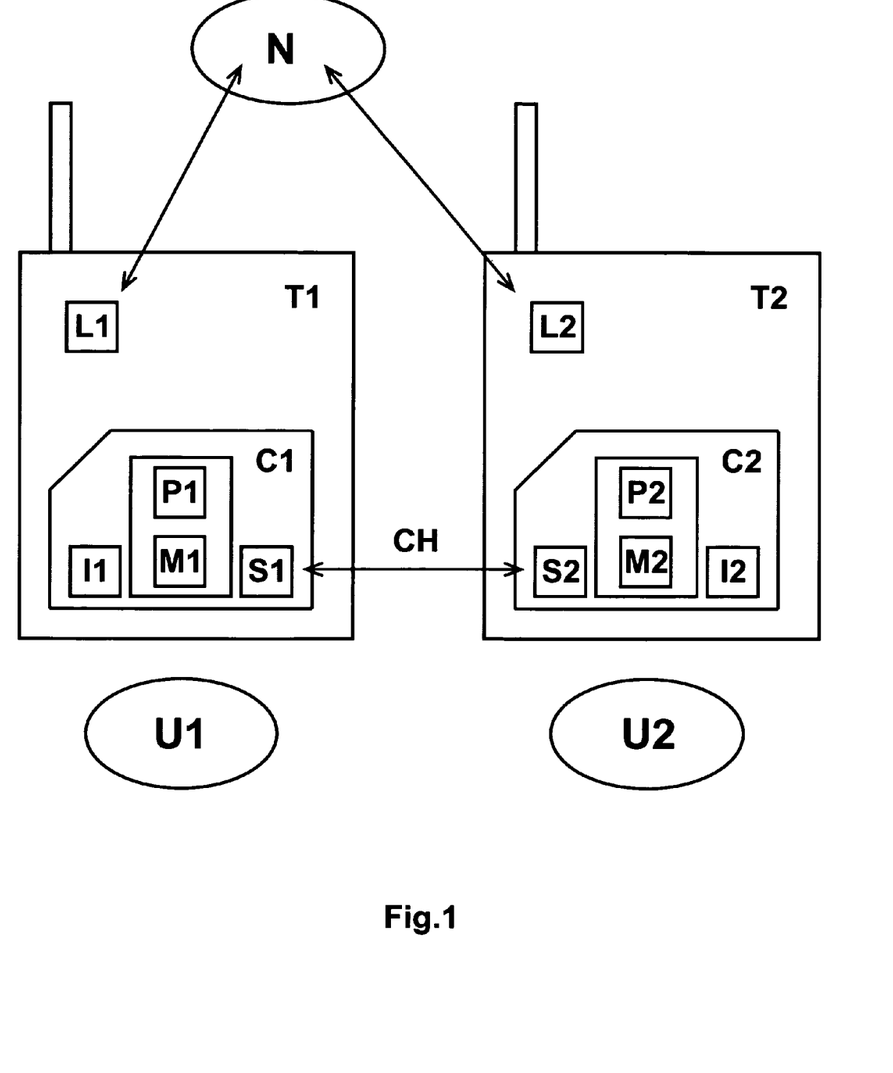
FIG. 1 shows schematically a simplified scenario wherein the present invention may be applied.

FIG. 1 shows a mobile telephone network N, a first mobile telephone terminal T1 with which a first subscriber identification card C1 is inserted and a second mobile telephone terminal T2 with which a second subscriber identification card C2 is inserted; in particular network N is a GSM or UMTS network, terminals T1 and T2 are two mobile phones and cards C1 and C2 are two SIM cards.

Both mobile telephone terminals T1 and T2 are adapted to communicate with the mobile telephone network N by internal long range radio communication transceivers L1 and L2 and of the subscriber identification cards C1 and C2 inserted within them, and are adapted to communicate with other mobile telephone terminals by short range radio communication transceivers S1 and S2 respectively integrated into the subscriber identification cards C1 and C2. Subscriber identification cards C1 and C2 stores identification and authentication information relating respectively to a first subscriber U1 and a second subscriber U2 (other information is stored in a SIM card, as well known in the art) and allow the enjoyment of one or more service provided by the mobile telephone network N such as for example voice communication, data communication (e.g. GPRS, WAP navigation. FTP download), SMS transfer; in other terms subscribers U1 and U2 have subscriptions for some services provided by the network with credit payment or debit payment.

Terminals T1 and T2 are standard mobile telephone terminals, for example mobile phones or computers associated or integrated with a mobile phone.

Cards C1 and C2 may have the architecture and the internal operation disclosed e.g. in patent applications WO2005104584 and WO2006056220 of the same Applicant; anyway, in order to implement the present invention, specific functionalities (implemented e.g. in firmware) are necessary for these cards.

For the purpose of the present invention it is worth mentioning that subscriber identification cards C1 and C2 comprises respectively interfaces I1 and I2, transceivers S1 and S2 and processing units P1 and P2; the interfaces I1 and I2 are adapted to connection to a mobile telephone terminal (for example T1 and T2) in order to allow long range direct communication of the mobile telephone terminal with the mobile telephone network N; the transceivers S1 and S2 are adapted to short range direct communication with other subscriber identifications cards and use in particular the ZIGBEE technology which is a very reliable and safe short range communication technology.

Processing units P1 and P2 comprise memories M1 and M2 for storing data and programs; a first part of each of the memories M1 and M2 is volatile (for example RAM) and a second part is non-volatile (for example EPROM and/or EEPROM and/or FLASH). One or more of the stored programs allow control of the transceiver and the interface. Some of the securely and permanently stored data relate to identification and authentication information of a first subscriber (U1 for C1 and U2 for C2), i.e. the rightful subscriber; other of the securely but non-permanently stored data may relate to identification and authentication information of a second subscriber, e.g. a "lending" subscriber.

In FIG. 1, a bidirectional short range communication channel (CH) is established between terminals T1 and T2 (more specifically between cards C1 and C2), a bidirectional long range communication channel is established between terminal T1 and network N and a bidirectional long range communication channel is established between terminal T2 and network N.

In general, according to the present invention, a method for enjoying a service through a mobile telephone terminal comprises the following steps:

A) providing a first mobile telephone terminal (T1) with a first subscriber identification card (C1) associated to the identity of a first subscriber; the first terminal (T1) is adapted to communicate with a first mobile telephone network (N1) by a long range radio communication transceiver (L1), and the first card (C1) is adapted to communicate with other subscriber identification cards (C2) by a short range radio communication transceiver (S1); additionally, the first card (C1) allows the enjoyment of a service provided by the first mobile telephone network (N1), B) the second terminal (T2) is adapted to communicate with a second mobile telephone network (N2) by a long range radio communication transceiver (L2), and the second card (C2) is adapted to communicate with other subscriber identification cards (C1) by a short range radio communication transceiver (S2), C) establishing a short range communication channel (CH) between the first card (C1) and the second card (C2) by their short range radio communication transceivers (S1, S2), D) transmitting from the first card (C1) to the second card (C2) by the channel (CH) a request to authorise a payment to be charged to the second subscriber for the benefit of the first subscriber, E) transmitting from the second card (C2) to the first card (C1) by the channel (CH) a grant of said payment authorisation request, F) informing the networks (N1, N2) of the granted request to be implemented by the networks (N1, N2) through the association of the identity of the first subscriber to the second terminal (T2) and of the identity of the second subscriber to the first terminal (T1), and G) enjoying said service through the first terminal (T1) based on said granted request.

Typically, before, during and after step F both the first card (C1) and the second card (C2) are active and operative in communicating together and with the associated terminals (T1, T2).

Figure 8:
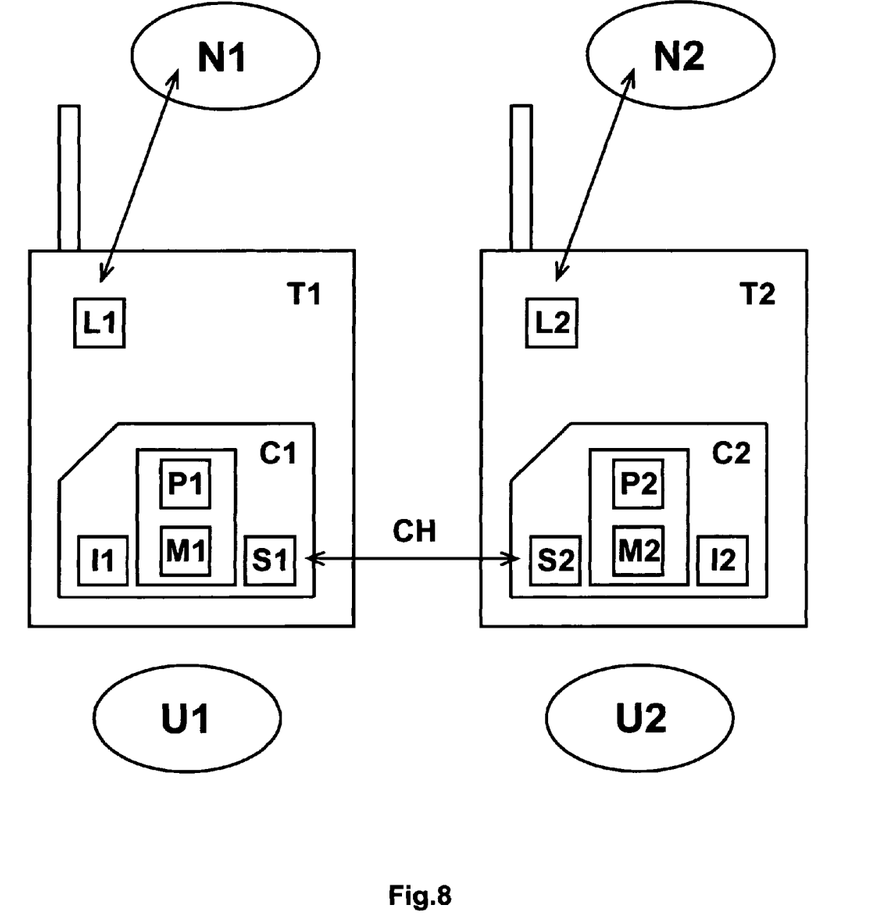
FIG. 8 shows schematically a more complex scenario wherein the present invention may be applied.

As already said, in the embodiment of FIG. 1, the first network and the second network correspond to the same mobile telephone network N; while, in the embodiment of FIG. 8, two different and distinct networks N1 and N2 are provided.

The above method was conceived according to a borrow/lend paradigm and for a limited time (from few minutes to few hours) even if, in theory, it may last for a longer time.

The above process steps (C, D, E and F) are carried out typically and advantageously thanks to one or more programs stored in the subscriber identification cards; therefore no changes are required to the mobile telephone terminals.

In the following reference is made to the embodiment of FIG. 1.

Step D is carried out after that the subscriber U1 has provided appropriate input (for example a command) to the mobile telephone terminal T1 where the card C1 is installed and step E is carried out after that the subscriber U2 has provided appropriate input (for example a command) to the mobile telephone terminal T2 where the card C2 is installed.

The request from subscriber U1 and/or the grant by subscriber U2 may comprise information specifying the authorisation scope, for example a period of time (for example 1 hour) corresponding to an authorisation duration and/or an amount of money (10 Euros) corresponding to an authorised payment, desired by subscriber U1 for enjoying a service. The scope of the authorisation highly depends on the requested service; for example, for an SMS service the scope may correspond to the number of SMS messages that can be transmitted, for an FTP download service the scope may correspond to the number of Mbytes or items (for example songs) that can be downloaded, for a DVH-H service the scope may correspond to the identification code of a broadcasted program (for example a football match).

According to simple embodiments of the present invention, the services that can be borrowed and lent are fixed and predetermined and correspond e.g. to all the services of the subscription of the requesting subscriber U1. According to more sophisticated embodiments, the service that can be borrowed and lent is variable and can be selected by the user; in this case, the authorisation request from subscriber U1 and/or the authorisation grant by subscriber U2 may comprise information specifying the desired service or services.

Preferably both mobile telephone terminals T1 and T2 informs the mobile telephone network N of the granted authorisation; this is typically carried out by the long range radio communication transceivers L1 and L2. Such notification to the network N typically comprises information about the identity of the two subscribers U1 and U2 and, if necessary, the scope of the authorisation and/or the borrowed/lent service or services.

In order to have the network N aware of the identities of the two subscribers U1 and U2 that have agreed on a borrowed/lent service, the payment authorisation request may comprise information specifying the identify (for example the IMSI code) of the requesting subscriber identification card (i.e. C1), and the payment authorisation grant may comprise information specifying the identify (for example the IMSI code) of the granting subscriber identification card (i.e. C2). In this way, when terminal T1 notifies the network N it may provide the identity of the granting card C2 and when terminal T2 notifies the network N it may provide the identity of the requesting card C1.

According to a typical application of the present invention, mobile telephone terminal T1 requests the mobile telephone network N to be associated to the identity of the subscriber identification card C2, and mobile telephone terminal T2 requests the mobile telephone network N to be associated to the identity of the subscriber identification card C1; in this way, an "identity exchange" is achieved with all the services associated to these cards.

According to this typical application, before step F both the mobile telephone terminals T1 and T2 may first deregister from the mobile telephone network N and then register again to the mobile telephone network N; in this way, the network N is not aware that an "identity exchange" has occurred.

Alternatively and advantageously, according to this typical application of "identity exchange", the network N becomes fully aware of the exchange of identity (thanks to the notification by the terminals T1 and T2) and arranges so that calls addressed to the subscriber identification card C1 are anyway directed to the mobile telephone terminal T1 and telephone calls addressed to the subscriber identification card C2 are anyway directed to the mobile telephone terminal T2 (as it is known, a mobile telephone terminal is identified by the IMEI [International Mobile Equipment Identity] code); in this way, the exchange of identity is effective for billing purposes but not for phone call reception purposes. More specifically, the exchange of identity between the mobile telephone terminal T1 and the mobile telephone terminal T2 may be effective for billing purposes only.

Advantageously, in case of "identity exchange", any authentication procedure of a subscriber identity is carried out through the card that rightfully holds this identity; in this way, there is no need to transmit authentication information securely stored within the card. This means that if an identity authentication is requested to terminal T1 by e.g. the mobile telephone network N during an "identity exchange", the card C1 forward the received authentication request to card C2 and then waits for an authentication response from card C2 in order to correctly reply to the identity authentication request; on the contrary, if no "identity exchange" is active, card C1 replies directly to any authentication request from the network N based on the authentication information stored in its memory M1.

One of the services that can be borrowed according to the present invention is an information (for example songs, movies, . . . ) download service; as already said, more and more in the future, these services will be provided through a DRM [Digital Right Management] system that allows enjoyment of the downloaded information only to e.g. one subscriber by encrypting information through data specific of this subscriber. In case of "identity exchange" and use of a DRM system, the mobile telephone terminal T1 downloads from the mobile telephone network N information encrypted through data specific of subscriber U1 (stored in card C1) even if the download is paid by the subscription associated to subscriber U2.

As already said, the authorisation to use services by a second subscriber to a first subscriber is intended for a limited time. Basically, the termination of the authorisation may take place in three different ways: (A) the mobile telephone network understands from the scope of the authorisation that the authorisation is exhausted (for example the period of time is expired or the amount of credit is spent), (B) any of the mobile telephone terminals T1 and T2 informs the mobile telephone network N that the authorisation is terminated due to the will of its subscriber, (C) any of the mobile telephone terminals T1 and T2 detects that the short range communication channel CH is interrupted and consequently informs the mobile telephone network N that the authorisation is terminated due to technical problems.

A more detailed description of a specific embodiment of the present invention follows with no limitation purposes.

Figure 2:
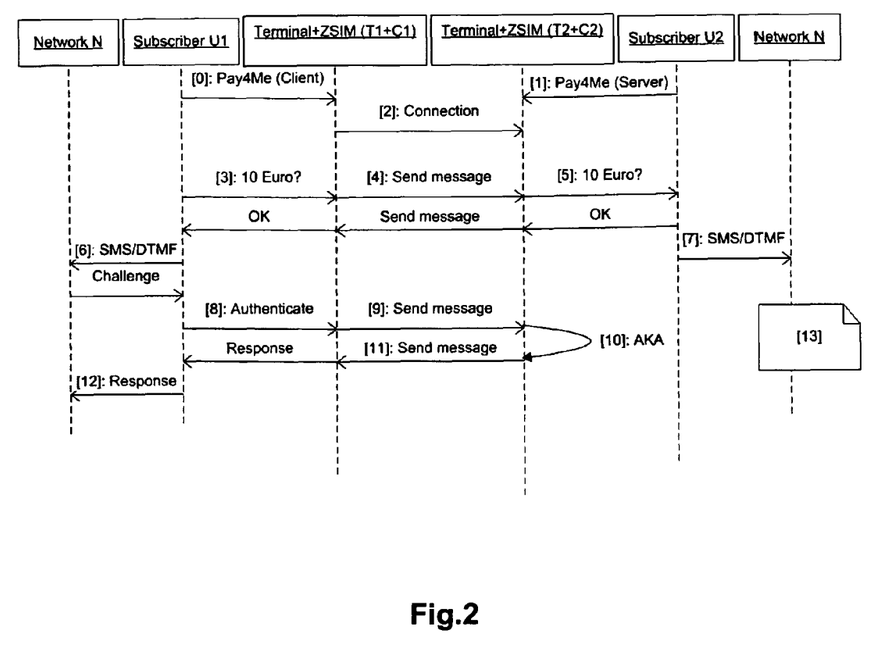
FIG. 2 is diagram where messages between various entities are shown according to an embodiment of the present invention.
Figure 3:
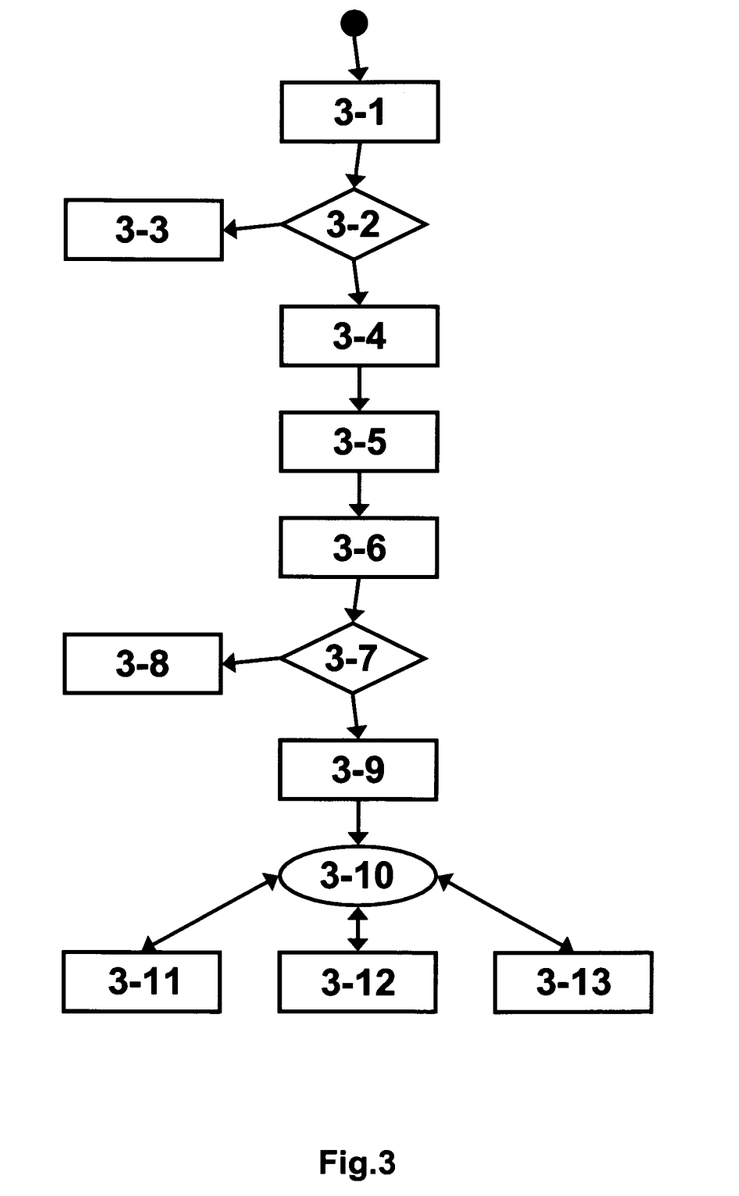
FIG. 3 is a flow chart relating to a first subscriber identification card (the borrowing card) according to an embodiment of the present invention.
Figure 4:
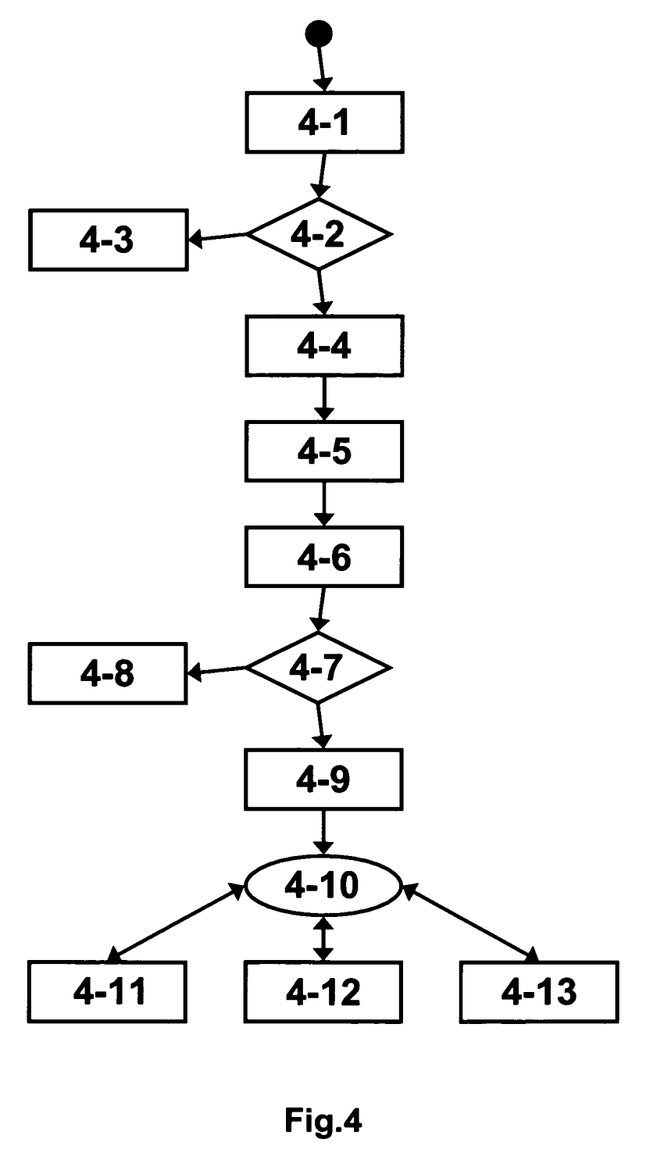
FIG. 4 is a flow chart relating to a second subscriber identification card (the lending card) according to an embodiment of the present invention.

According to FIG. 2, a subscriber U1 having a mobile phone T1 (with a SIM card C1) starts a process whereby he asks to borrow e.g. a certain amount of credit from subscriber U2 having a mobile phone T2 (with a SIM card C2) located in the vicinity (for example 1-10 meters) of mobile phone T1 in order to enjoy some kind of service provided by the network operator that issued both SIM cards C1 and C2; both SIM cards C1 and C2 are provided also with short range communication capability in particular through the ZIGBEE technology as described before and will be referred to as ZSIM cards in the following. Flow chart of the behavior of the two ZSIM cards C1 and C2 is shown in FIG. 3 and FIG. 4 while the sequence diagram is shown in FIG. 2.

Subscriber U1 selects from his "toolkit application menu" (a menu of the available applications on the SIM) the "Pay4Me" item [0]. It is important to note that the "toolkit application menu" is a standard feature of mobile telephone terminals available on the market nowadays, and that a mobile telephone terminal do not need to be aware of the nature of the applications available on the SIM; therefore, no change is required to a standard mobile telephone terminal in order to implement the "Pay4Me" new service.

A "Pay4Me" applet (in Client mode) on-board the ZSIM card C1 checks for the presence of other ZSIM cards with the same applet on-board in the vicinity (depending on the actual radio coverage allowed by the technology and by the environment). ZSIM card C2 is in the vicinity and has a "Pay4Me" applet on-board therefore the applet (in Server mode) on card C2 will reply [1] to the applet (in Client mode) on card C1; subscriber U2 may be involved in such reply. A proximity communication channel CH is established [2] between the two ZSIM cards.

From a menu on terminal T1, subscriber U1 is prompted [3] to insert the amount of e.g. credit he wants to ask for. This value is sent to terminal T2 [4] through the proximity channel CH and subscriber U2 is asked [5] by terminal T2 to authorise the use of the requested e.g. credit to subscriber U1; for security reasons, the authorisation may be subject to the input of a PIN [Personal Identification Number] or other equivalent security measures.

At this stage the two ZSIM cards C1 and C2 send messages (for example SMS, DTMF, USSD, . . . ) to the network N containing identification data (for example their IMSI codes) in order to inform the network N that an identity exchange (indeed with some limitations) is requested (typically for a limited period of time) between the two cards. In fact, ZSIM card C1 sends a message [6] to inform the network N that it has asked for a certain amount of e.g. credit to ZSIM card C2 associated to a certain phone number; ZSIM card C2 sends a message [7] to inform the network N that it has (locally=i.e. through the proximity channel CH) authorized ZSIM card C1 to use this certain amount of e.g. credit.

The network N associates the authentication set of data, e.g. the GSM triplets (in case of UMTS they would be quin-tuplets), calculated for ZSIM card C1 to ZSIM card C2 and those for ZSIM card C2 to ZSIM card C1.

The following explanation refers only to terminal T1 and ZSIM card C1 as a specular explanation applies also to terminal T2; this simplification [13] applies to FIG. 2 as well.

Then the network N, using these swapped set, sends an authentication request [8] to terminal T1 and ZSIM card C1. When ZSIM card C1 receives the challenge from the network N, it forward this request [9] to ZSIM card C2 using the proximity channel CH. ZSIM card C2 calculates the response [10] and send it [11] to ZSIM card C1 using the proximity channel CH. This response associated to ZSIM card C2 subscription is sent [12] to the network N by ZSIM card C1 and terminal T1.

If the above process succeeds, the two subscribers U1 and U2 will have exchanged their subscriptions and consequently their credits for a limited period of time. During this period the network N carries out all necessary operations for guaranteeing that:
1. use by subscriber U1 of any service associated to his subscription will consume the credit of subscriber U2, up to e.g. the authorised amount,
2. use by subscriber U1 of any local service associated to ZSIM card C1 will be possible,
3. use by subscriber U2 of any local service associated to ZSIM card C2 will be possible,
4. both subscribers U1 and U2 will preferably continue to receive incoming phone calls and SMS messages addresses to their identities/numbers through their terminals T1 and T2 (with ZSIM cards C1 and C2).

As far as subscriber U2 and his subscription are concerned, three different possibilities may be implemented according to the present invention: (a) use by subscriber U2 of any service associated to its subscription will consume the credit of subscriber U1, (b) use by subscriber U2 of any service associated to its subscription will consume the credit of subscriber U2, (c) use by subscriber U2 of any service associated to its subscription is temporarily disabled.

According to the above embodiment, the "identity exchange" or "subscription exchange" is transparent to the terminal. ZSIM card C1 reads the IMSI code from ZSIM card C2 trough the proximity channel CH and vice versa ZSIM card C2 reads the IMSI code from ZSIM card C1 trough the proximity channel CH. Both ZSIM cards C1 and C2 send an SMS message (or a USSD signalling) to the network N with the request to activate the service and their new IMSI codes. The network N provides to exchange e.g. the GSM triplets and, from the next authentication request until the service termination, sends to Terminal T1 with ZSIM card C1 the challenge associated to ZSIM card C2 and vice versa to Terminal T2 with ZSIM card C2 the challenge associated to ZSIM card C1.

Alternatively, a different method could be used which is transparent to the network N. ZSIM card C1 read the IMSI code of ZSIM card C2 from ZSIM card C2 through the proximity channel CH and vice versa ZSIM card C2 read the IMSI code of ZSIM card C1 from ZSIM card C1. Both ZSIM cards send a toolkit command call REFRESH in order to restart the terminal initialization procedure; when the terminal send a READ BINARY command to read the IMSI code ZSIM card C1 provides the IMSI code of ZSIM card C2 to the terminal T1 and ZSIM card C2 provides the IMSI code of ZSIM card C1 to the terminal T2. The network N is not affected by this exchange (due to the restart carried out by both ZSIM cards C1 and C2) and will believe that ZSIM card C1 is ZSIM card C2 as it has received from terminal T1 that IMSI code and vice versa that ZSIM card C2 is ZSIM card C1 as it has received from terminal T2 that IMSI code. In this case, it is up to the network to reroute calls and/or messages and/or data to the right terminal.

The process can end when one or both the subscribers U1 and U2 decide to stop it or when the proximity channel CH is interrupted. In the first case the process ends voluntarily and the network N is notified and can make all the proper actions to restore the initial conditions. In the second case the process ends accidentally and a recovery procedure may be necessary.

When one (or both) subscriber decides to stop the process he selects an appropriate menu item from his toolkit application menu. The connection between the two ZSIM cards C1 and C2 through the proximity channel CH is terminated and both ZSIM card C1 and ZSIM card C2 send data to the network N to inform it that the "identity exchange" or "subscription exchange" is terminated. At this time the network N restores the initial conditions both internally and with respect to the ZSIM cards.

As soon as one of the two ZSIM cards C1 or C2 understands that the proximity channel CH is interrupted, it displays on the corresponding mobile terminal a warning message and asks the user if he wants to try to restore the channel and to continue the process previously started procedure with the other ZSIM card or he wants to end the process. In the latter case, the network N is promptly notified. It is to be noticed that, according to an alternative and simpler solution, as soon as a ZSIM card that detects interruption of the proximity channel it may terminate the process and notify the network immediately without asking anything to the user.

Reference will now be made to the flow chart of FIG. 3 that refers to the behavior of ZSIM card C1 when its subscriber U1 sends a request of a service according to the present invention and to the flow chart of FIG. 4 that refers to the behavior of ZSIM card C2 when its subscriber U2 receives a request of a service according to the present invention.

The following steps take place in ZSIM card C1:

Step 3-1: ZSIM card C1 scans for ZSIM cards in the vicinity with an applet "Pay4Me" enabled;

Step 3-2: ZSIM card C1 checks if such a ZSIM card is found; if NO step 3-3 is carried out and if YES step 3-4 is carried out;

Step 3-3: ZSIM card C1 signals to the user that no suitable ZSIM was found;

Step 3-4: ZSIM card C1 prompts the user to select from a list of suitable ZSIM cards and receives the selection by the user;

Step 3-5: ZSIM card C1 prompts the user to input e.g. the amount of desired credit and receives the input by the user;

Step 3-6: ZSIM card C1 asks the selected ZSIM card for the authorisation to use the input amount of credit;

Step 3-7: ZSIM card C1 checks whether authorisation is granted by the selected ZSIM card; if NO step 3-8 is carried out and if YES step 3-9 is carried out;

Step 3-8: ZSIM card C1 signals to the user that the authorisation for the input amount of credit has not been granted by the selected ZSIM card;

Step 3-9: ZSIM card C1 informs the network N that the authorisation has been granted and that the "identity exchange" or "subscription exchange" is to be activated;

Step 3-10: ZSIM card C1 carries out a loop until the process is terminated; this loop provides for the steps 3-11, 3-12 and 3-13;

Step 3-11: ZSIM card C1 monitor the proximity channel CH for messages (in particular identification and authentication messages) from an external ZSIM card, Step 3-12: ZSIM card C1 monitor terminal T1 for messages (in particular identification and authentication messages) from the network N, Step 3-13: ZSIM card C1 monitor terminal T1 for messages from the user or from the network N not relating to the "Pay4Me" service.

The following steps take place in ZSIM card C2:

Step 4-1: ZSIM card C2 scans for ZSIM cards in the vicinity with an applet "Pay4Me" enabled;

Step 4-2: ZSIM card C2 checks if such a ZSIM card is found; if NO step 4-3 is carried out and if YES step 4-4 is carried out;

Step 4-3: ZSIM card C2 signals to the user that no suitable (with an applet "Pay4Me" enabled) ZSIM was found;

Step 4-4: ZSIM card C2 prompts the user to select from a list of suitable (with an applet "Pay4Me" enabled) ZSIM cards and receives the selection by the user;

Step 4-5: ZSIM card C2 receives from the selected ZSIM card the request to use e.g. an amount of credit;

Step 4-6: ZSIM card C2 prompts the user to input his reply to the requested amount of credit;

Step 4-7: ZSIM card C2 checks whether authorisation is granted by the user; if NO step 4-8 is carried out and if YES step 4-9 is carried out;

Step 4-8: ZSIM card C2 signals to ZSIM card C1 that the authorisation for the input amount of credit has not been granted;

Step 4-9: ZSIM card C2 informs the network N that the authorisation has been granted and that the "identity exchange" or "subscription exchange" is to be activated;

Step 4-10: ZSIM card C2 carries out a loop until the process is terminated; this loop provides for the steps 4-11, 4-12 and 4-13;

Step 4-11: ZSIM card C2 monitor the proximity channel CH for messages (in particular identification and authentication messages) from an external ZSIM card, Step 4-12: ZSIM card C2 monitor terminal T1 for messages (in particular identification and authentication messages) from the network N, Step 4-13: ZSIM card C2 monitor terminal T1 for messages from the user or from the network N not relating to the "Pay4Me" service.

Figure 5:
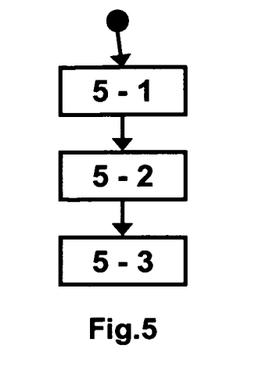
FIG. 5 is a detailed flow chart of one step (authentication request from another card) of the flow charts of FIG. 3 and FIG. 4.
Figure 6:
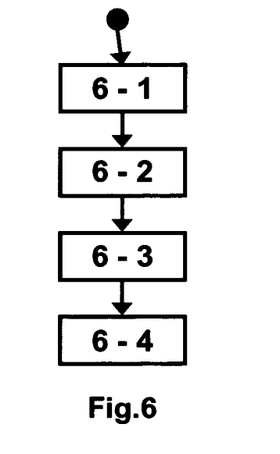
FIG. 6 is a detailed flow chart of one step (authentication request from the network) of the flow charts of FIG. 3 and FIG. 4.
Figure 7:
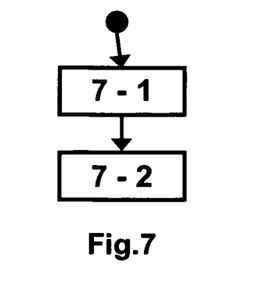
FIG. 7 is a detailed flow chart of one step (other requests) of the flow charts of FIG. 3 and FIG. 4.

Step 3-11 and step 4-11 provide for the same (or almost the same) activities that are shown in more detail in the flow chart of FIG. 5; step 3-12 and step 4-12 provide for the same (or almost the same) activities that are shown in more detail in the flow chart of FIG. 6; step 3-13 and step 4-13 provide for the same (or almost the same) activities that are shown in more detail in the flow chart of FIG. 7.

FIG. 5 shows three consecutive steps:

Step 5-1: reception of an authentication request from an external ZSIM card through the proximity channel CH;

Step 5-2: local computation of the authentication response;

Step 5-3: transmission of the authentication response to the external ZSIM card through the proximity channel CH.

FIG. 6 shows four consecutive steps:

Step 6-1: reception of an authentication request from the network N;

Step 6-2: forwarding of the authentication request to an external ZSIM card through the proximity channel CH;

Step 6-3: reception of the authentication response from the external ZSIM card through the proximity channel CH;

Step 6-4: forwarding of the authentication response to the network N.

FIG. 7 shows two consecutive steps:

Step 7-1: reception of a request from the user or from the network N not relating to the "Pay4Me" service;

Step 7-2: local generation and transmission of a response to this request.

It is to be noted that a ZSIM card (C1;C2) receives requests from other ZSIM cards through the proximity channel CH by its internal short range communication transceiver (S1;S2) and any other request (either from the user of from the network N) by its internal interface (I1;I2). Requests from the network N are first received from the terminal (T1;T2) through its internal long range communication transceiver (L1;L2) and then forwarded to the ZSIM card (C1;C1) through its interface (I1;I2); responses to the network N are generated by a ZSIM card (C1;C2), then forward to the terminal (T1;T2) by means its internal interface (I1,I2), and finally transmitted to the network N by the long range communication transceiver (L1;L2).

It appears that a very specific aspect of the present invention and of the above described embodiment is that the SIM cards act as a filter of requests coming from the terminal and from the proximity channel and acts differently according to the type and source of request it receives. If the request comes from the network (through the terminal) and is an authentication challenge, the challenge is sent to the other SIM and the response from the other SIM is sent back to the terminal, which does not perceives the difference. If the request comes from the other SIM through the proximity channel and is an authentication challenge, the challenge is processed locally and the response is sent to the other SIM. If the request comes from the terminal and is related to a service that is on the SIM (but is not related to the "Pay4Me" service) the response is dealt with locally and the response is sent to the terminal, without any involvement of the proximity channel.

As already said, in order to implement the present invention the use of appropriate subscriber identification cards is necessary.

As already said, the present invention is applicable also to a scenario wherein the two subscriber identity cards C1 and C2 are respectively associated to two different and distinct mobile telephone networks N1 and N2 of two different mobile telephone operators; this is shown in FIG. 8.

In case of two networks and two operators, technical and commercial agreements between the two entities are in place.

Such agreements may be necessary from one side for rerouting calls and/or messages and/or data to the right terminal and from another side for correct billing.

The present invention provides also a specific subscriber identification card that is adapted to be used for implementing the above described method; it is to be noted that even different subscriber identification cards may be used to this purpose.

In general, a subscriber identification card (C1;C2) according to the present invention comprises an interface (I1;I2), a transceiver (S1;S2) and a processing unit (P1;P2); the interface (I1;I2) is adapted to connection to a mobile telephone terminal (T1;T2) in order to allow long range direct communication of the mobile telephone terminal (T1;T2) with a mobile telephone network (N1;N2); the transceiver (S1;S2) is adapted to short range direct communication with other subscriber identifications cards; the processing unit (P1;P2) stores a program adapted:
   to control the transceiver (S1;S2) so that to transmit payment authorisation requests and to receive corresponding payment authorisation responses,
   to control the transceiver (S1;S2) so that to receive payment authorisation requests and to transmit corresponding payment authorisation responses, and
   to control the interface (I1;I2) so that to inform said mobile telephone network of granted requests.

According to a first embodiment of the card, such subscriber identification card (C1;C2) comprises a memory (M1;M2) storing subscriber identification and authentication information relating to a subscriber (U1;U2) and the processing unit (P1;P2) stores a program that during a first operating mode (when no "identity exchange" is active) is adapted:
   to control its interface (I1;I2) so that to receive authentication requests relating to said subscriber (U1;U2) and to transmit corresponding authentication responses relating to said subscriber (U1;U2) based on said stored subscriber identification and authentication information;

during a second operating mode (when "identity exchange" is active) is adapted:
   to control its interface (I1;I2) so that to receive authentication requests relating to another subscriber (U2;U1) and to transmit corresponding authentication responses relating to said another subscriber (U2;U1),
   to control its transceiver (S1;S2) so that to transmit authentication requests relating to said another subscriber (U2;U1) and to receive corresponding authentication responses relating to said another subscriber (U2;U1),
   to control its transceiver (S1;S2) so that to receive authentication requests relating to said subscriber (U1;U2) and to transmit authentication responses relating to said subscriber (U1;U2).

Thanks to the software the card according to this first embodiment, the subscriber authentication information (Ki) never leaves the safe internal memory of the card.

According to a second embodiment of the card, such subscriber identification card (C1;C2) comprising a memory (M1;M2) adapted to store permanently subscriber identification and authentication information relating to a first subscriber (U1;U2—i.e. the "rightful subscriber") and to store temporary subscriber identification and authentication information relating to a second subscriber (U2;U1—i.e. the "lending subscriber"); the subscriber identification and authentication information relating to a second subscriber (U2;U1) is received from another subscriber identification card (C2;C1) through the short radio communication transceiver (S1;S2).

Thanks to the software means of the card according to this second embodiment, the subscriber identification information and (more important) the subscriber authentication information of the second subscriber leaves the safe internal memory of a card (for example C2) but directly goes into the safe internal memory of another card (for example C1); for further data security, the ZIGBEE technology is used for establishing an encrypted proximity channel between the cards.

The present invention, particularly its method, may find many different applications; in the following, a couple of practical examples will be described within environments (mobile telephone network, mobile telephone terminals, subscriber identification cards) implementing the present invention.

According to the first example, two friends, Bob and Alice, want to enjoy a new Hollywood comedy transmitted in Pay-per-View while being in mobility (e.g. they are waiting for a flight, or taking a long train journey). Alice has a DVB-H mobile handset with a DVB-H SIM card, while Bob's phone is not able to receive broadcast services. Bob offers to pay for the film because Alice's credit is over, or simply for giving her a gift. Then Alice selects the operator's service "Pay4Me", inserts the cost of the film and asks for Bob authorization. Once the credit request is accepted by Bob, a temporary subscription exchange happens as described above, and the two friends can watch the film.

The present invention may be used also within the context of DRM-enabled services, as the following second example clarifies.

Alice is a registered user of an online mobile music service and has a large collection of music tracks on her mobile phones. The music tracks she buys from the aforementioned service are protected with OMA DRM 2.0 technology in a way that none else but Alice herself is able to consume the content (i.e. the content is bound to her SIM card, that has to be plugged in the phone at the time of consumption).

Alice is notified by her mobile operator about the possibility to buy a new song of her favourite music group at a discount price, as long as she performs the purchase transactions within a short amount of time (e.g. the following ten minutes). Unfortunately, her personal credit is over and therefore she cannot complete the purchase.

Alice decides to ask her friend Bob for lending her some credit. Alice selects the "Pay4Me" option from the user menu of her phone, inputs the amount of money required for the purchase and sends a payment request to the Bob's phone.

After Bob's acceptance, Alice is able to complete the purchase transaction.

Although the payment is completed via Bob's SIM card credentials, the service provider, that was previously notified about the temporary identity exchange between the Bob's and Alice's SIM cards, can properly protect the usage license for the music track (i.e. bind the consumption of the content to Alice's SIM, whose details are known to the service provider itself for the purpose of applying the DRM protection) and subsequently deliver it to Alice's phone.

The invention claimed is:

1. A subscriber identification card comprising:
   an interface adapted to connect to a mobile telephone terminal in order to allow long range communication of said mobile telephone terminal with a mobile telephone network;
   a transceiver adapted to short range communication with other subscriber identifications cards;
   a processor; and
   first memory storing computer-readable instructions that, when executed by the processor, cause the subscriber identification card to:
      control said transceiver to transmit a payment authorization request to a second subscriber identification card and to receive, from the second subscriber identification card, a corresponding payment authorization response, wherein said transmitted payment authorization request comprises information specifying an identity of a first subscriber associated with the subscriber identification card, and wherein said received corresponding payment authorization response comprises information specifying an identity of a second subscriber associated with the second subscriber identification card,
      control said transceiver to receive, from the second subscriber identification card, a payment authorization request and to transmit a corresponding payment authorization response to the second subscriber identification card, wherein said received payment authorization request comprises information specifying the identity of the second subscriber associated with the second subscriber identification card, and wherein said transmitted corresponding payment authorization response comprises information specifying the identity of the first subscriber associated with the subscriber identification card,
      control said interface to inform said mobile telephone network of granted requests by said mobile telephone terminal requesting said mobile telephone network by the long range communication to be associated with the identity of said second subscriber, and
      authorize use of a service different from the payment authorization.

2. The subscriber identification card according to claim 1, comprising a second memory storing subscriber identification and authentication information relating to a subscriber, wherein said first memory stores additional computer-readable instructions that, when executed by the processor, cause the subscriber identification card to:
   during a first operating mode:
      control said interface to receive authentication requests relating to said subscriber and to transmit corresponding authentication responses relating to said subscriber based on said stored subscriber identification and authentication information; and
   during a second operating mode:
      control said interface to receive authentication requests relating to another subscriber and to transmit corresponding authentication responses relating to said another subscriber,
      control said transceiver to transmit authentication requests relating to said another subscriber and to receive corresponding authentication responses relating to said another subscriber, and
      control said transceiver to receive authentication requests relating to said subscriber and to transmit authentication responses relating to said subscriber.

3. The subscriber identification card according to claim 1, comprising a second memory adapted to store permanent subscriber identification and authentication information relating to a first subscriber and to store temporary subscriber identification and authentication information relating to a second subscriber, said subscriber identification and authentication information relating to a second subscriber being received from another subscriber identification card through said transceiver.

4. A method for using a service through a mobile telephone terminal comprising the steps of:
   A) providing a first mobile telephone terminal with a first subscriber identification card associated with an identity of a first subscriber, said first mobile telephone terminal being adapted to communicate with a first mobile telephone network by a long range radio communication transceiver, and said first subscriber identification card being adapted to communicate with other subscriber identification cards by a short range radio communication transceiver, said first subscriber identification card allowing the use of a service provided by said first mobile telephone network,
   B) providing a second mobile telephone terminal with a second subscriber identification card associated with an identity of a second subscriber, said second mobile telephone terminal being adapted to communicate with a second mobile telephone network by a long range radio communication transceiver, and said second subscriber identification card being adapted to communicate with other subscriber identification cards by a short range radio communication transceiver,
   C) establishing a short range communication channel between said first subscriber identification card and said second subscriber identification card by their short range radio communication transceivers,
   D) transmitting from said first subscriber identification card to said second subscriber identification card by said channel a request to authorize a payment to be charged to said second subscriber for the use of said service by said first subscriber, wherein said request comprises information specifying the identity of said first subscriber,
   E) transmitting from said second subscriber identification card to said first subscriber identification card by said channel a grant of said payment authorization request, wherein said grant comprises information specifying the identity of said second subscriber, F) informing said first mobile telephone network and said second mobile telephone network of said granted request to be implemented by said first mobile telephone network and said second mobile telephone network by:
  F1) said first mobile telephone terminal requesting said first mobile telephone network by its long range radio communication transceiver to be associated with the identity of said second subscriber, and
  F2) said second mobile telephone terminal requesting said second mobile telephone network by its long range radio communication transceiver to be associated with the identity of said first subscriber, and
G) using said service through said first mobile telephone terminal based on said granted request, wherein said service used through said first mobile telephone terminal is different from said payment charged to said second subscriber.

5. The method according to claim 4, wherein before, during and after said step F:
said first subscriber identification card and said second subscriber identification card are active and operative in communicating with one another;
said first subscriber identification card is operative in communicating with the first mobile telephone terminal; and
said second subscriber identification card is operative in communicating with the second mobile telephone terminal.

6. The method according to claim 4, wherein said first mobile telephone network and said second mobile telephone network correspond to the same mobile telephone network.

7. The method according to claim 4, wherein at least one of said request and said grant comprise information specifying an authorization scope.

8. The method according to claim 7, wherein said request and said grant comprise information specifying the authorization scope, and wherein the authorization scope of said request corresponds to the authorization scope of said grant.

9. The method according to claim 7, wherein at least one of said request and said grant comprise information specifying a period of time corresponding to an authorization duration.

10. The method according to claim 7, wherein at least one of said authorization request and said grant comprise information specifying a maximum amount of money that can be charged to said second subscriber, the method further comprising the step of:
preventing use of the service through said first mobile telephone terminal if an amount of money used by said first subscriber reaches the maximum amount of money that can be charged to said second subscriber.

11. The method according to claim 4, wherein using said service through said first mobile telephone terminal causes a corresponding amount of credit to be deducted from an account of said second subscriber.

12. The method according to claim 4, wherein, after said step F, telephone calls addressed to said first subscriber are directed to said first mobile telephone terminal and telephone calls addressed to said second subscriber are directed to said second mobile telephone terminal.

13. The method according to claim 4, wherein, after said step F, the association of the identity of said first subscriber to said second mobile telephone terminal and of the identity of said second subscriber to said first mobile telephone terminal is effective for billing purposes only.

14. The method according to claim 4, further comprising:
before said step F, said first mobile telephone terminal deregisters from said first mobile telephone network and then registers again to the first mobile telephone network and said second mobile telephone terminal deregisters from said second mobile telephone network and then registers again to said second mobile telephone network.

15. The method according to claim 4, wherein, after said step F, when said first mobile telephone network requests an identity authentication to said first mobile telephone terminal, said first mobile telephone terminal collects an authentication response from said second subscriber identification card by said first subscriber identification card and said short range communication channel and transmits the collected authentication response to said first mobile telephone network, and wherein, after said step F, when said second mobile telephone network requests an identity authentication to said second mobile telephone terminal, said second mobile telephone terminal collects an authentication response from said first subscriber identification card by said second subscriber identification card and said short range communication channel and transmits the collected authentication response to said second mobile telephone network.

16. The method according to claim 4, wherein, after said step F, if said first mobile telephone terminal downloads, from said first mobile telephone network, information encrypted through subscriber specific data, said information is encrypted through data specific of said first subscriber associated with said first subscriber identification card.

17. The method according to claim 4, wherein said step F provides that said first mobile telephone network and said second mobile telephone network are informed of the scope of said granted request and of the corresponding authorization.

18. The method according to claim 4, wherein, after said step F, at least one of said first mobile telephone terminal and said second mobile telephone terminal inform at least one of said first mobile telephone network and said second mobile telephone network that said granted request and the corresponding authorization is terminated.

19. The method according to claim 18, wherein when any of said first and second subscriber identification cards detects that said short range communication channel is interrupted, any of said first and second mobile telephone terminals inform any of said first and second mobile telephone networks that said granted request and the corresponding authorization is terminated.

20. The method according to claim 4, wherein said short range communication channel is established through ZIGBEE technology.

21. The method of claim 4, wherein the service comprises an information download service, and wherein using said service through said first mobile telephone terminal comprises downloading information using the information download service, the method further comprising:
  H) in response to downloading information using the information download service, charging, to said second subscriber, an amount corresponding to the downloaded information.

22. The method of claim 21, wherein the information download service comprises a music download service, and wherein the downloaded information comprises a song.

* * * * *

UNITED STATES PATENT AND TRADEMARK OFFICE
CERTIFICATE OF CORRECTION

PATENT NO. : 8,700,092 B2
APPLICATION NO. : 12/810723
DATED : April 15, 2014
INVENTOR(S) : De Petris et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 401 days.

Signed and Sealed this
Twenty-ninth Day of September, 2015

Michelle K. Lee
*Director of the United States Patent and Trademark Office*